United States Patent [19]
Bell et al.

[11] Patent Number: 5,636,904
[45] Date of Patent: Jun. 10, 1997

[54] BRUSH CONSTRUCTION

[75] Inventors: William E. Bell, Lawrenceville; Maurice R. Brosio, Dunwoody, both of Ga.

[73] Assignee: Flo-Pac Corporation, Minneapolis, Minn.

[21] Appl. No.: 274,805

[22] Filed: Jul. 14, 1994

Related U.S. Application Data

[63] Continuation-in-part of Ser. No. 22,809, May 12, 1994, Pat. No. Des. 365,210.

[51] Int. Cl.$^6$ .............................. A46D 1/08; A46D 3/00
[52] U.S. Cl. .................................. 300/21; 300/20
[58] Field of Search ................... 300/20, 21; 15/191.1, 15/192, 193

[56] References Cited

FOREIGN PATENT DOCUMENTS

| | | |
|---|---|---|
| 543367 | 12/1955 | Belgium . |
| 1138479 | 6/1957 | France . |
| 2380754 | 9/1978 | France . |
| 801052 | 12/1950 | Germany ................................ 300/21 |
| 924144 | 2/1955 | Germany . |
| 3501098 | 7/1986 | Germany ................................ 300/21 |
| 3642124 | 6/1988 | Germany ................................ 300/21 |
| 3832520 | 4/1990 | Germany ................................ 300/21 |
| 4302870 | 8/1994 | Germany ................................ 300/21 |
| 342248 | 1/1931 | United Kingdom . |

*Primary Examiner*—John M. Husar
*Attorney, Agent, or Firm*—Christensen O'Connor Johnson & Kindness PLLC

[57] ABSTRACT

A brush designed with a hook built into the handle for hanging the brush on the side of a can or container. The brush is formed by a new method in which the tufts have a tapered knot and the handle is molded around the tapered knot such that the knot is anchored in the handle.

14 Claims, 4 Drawing Sheets

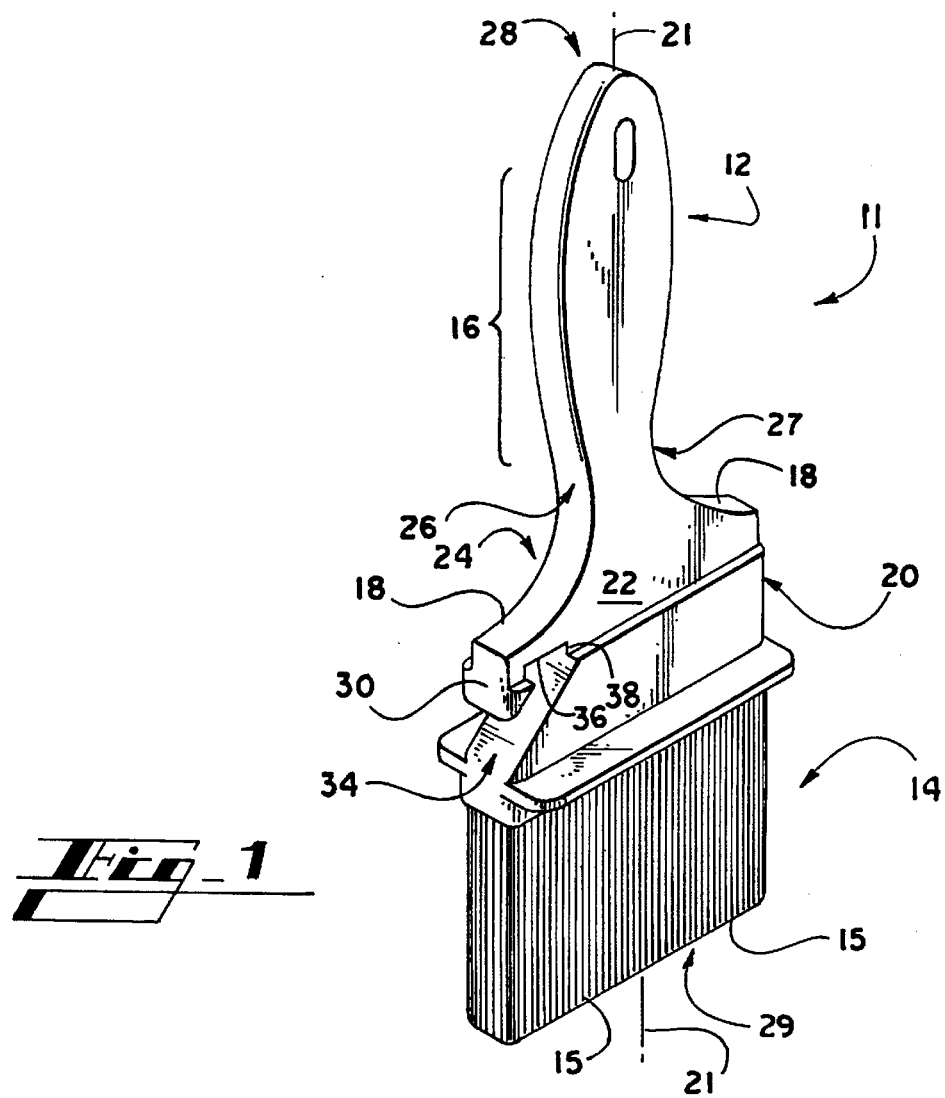
Fig_1
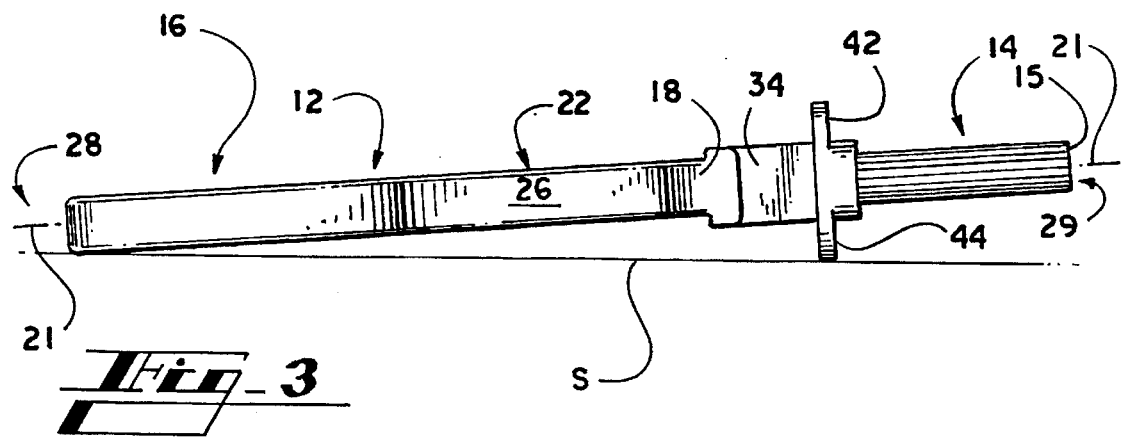
Fig_3

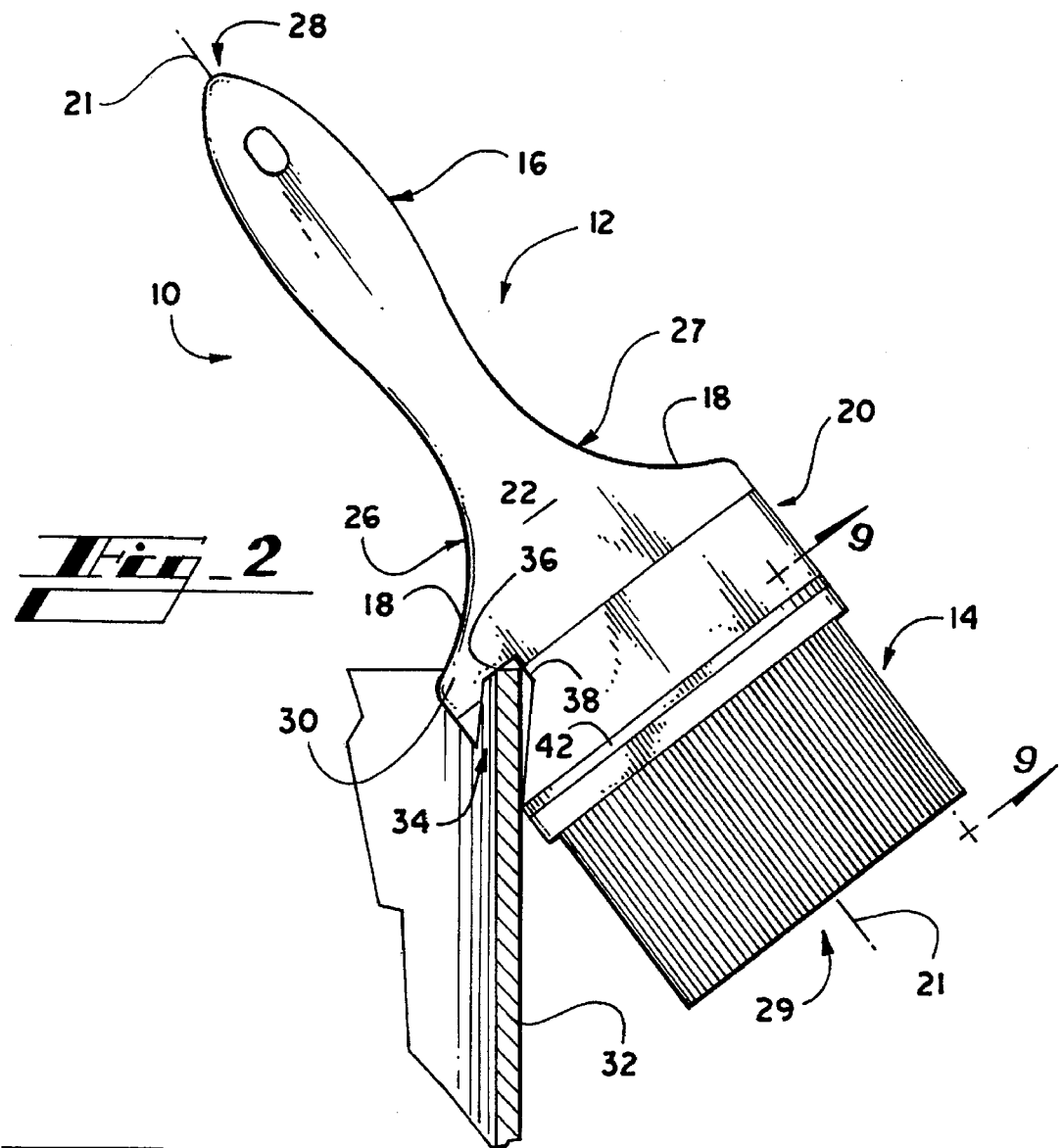
Fig_2
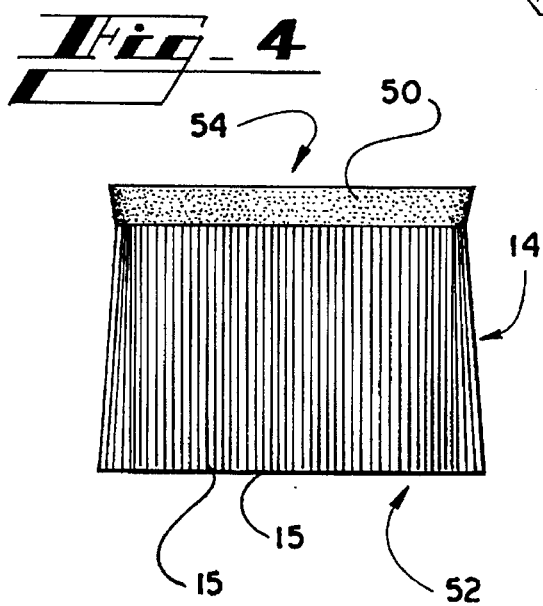
Fig_4
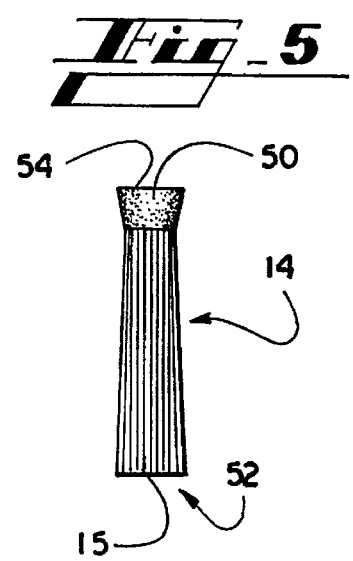
Fig_5

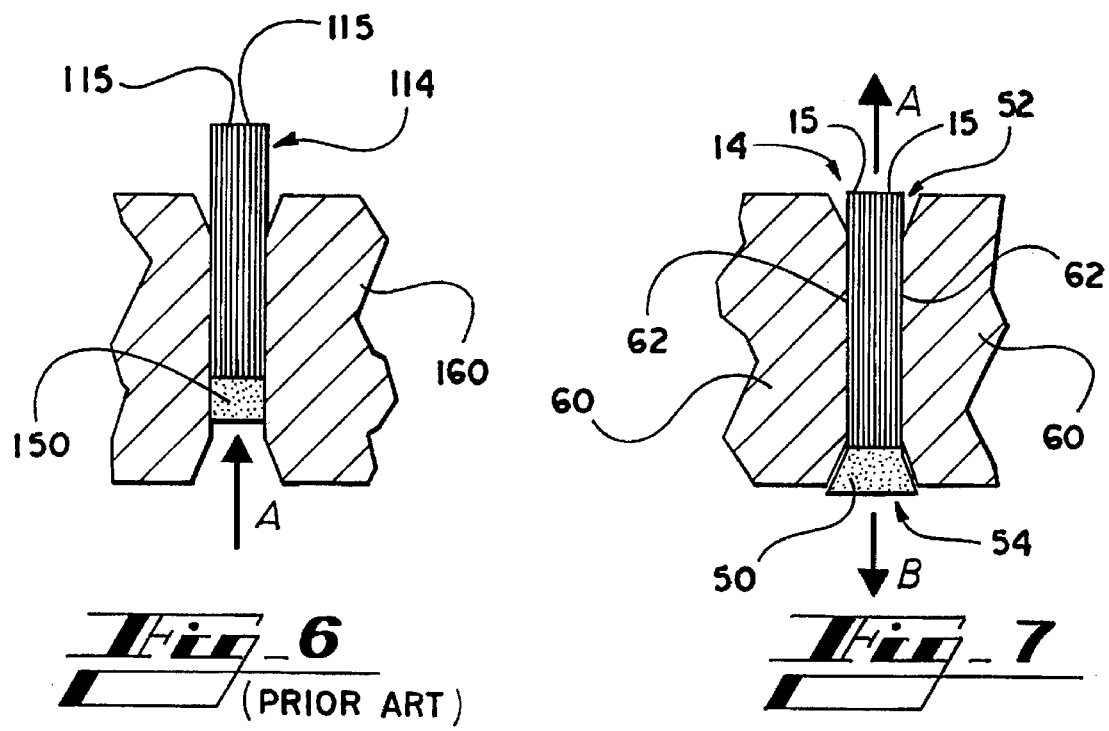
Fig_6 (PRIOR ART)
Fig_7
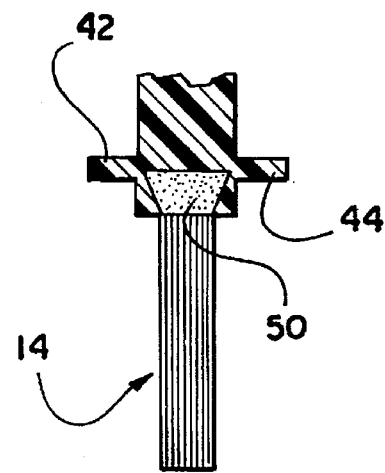
Fig_9

BRUSH CONSTRUCTION

REFERENCED TO RELATED APPLICATION

This application is a continuation-in-part of design application No. 29/022,809 filed May 12, 1994 now U.S. Pat. No. D365,210.

FIELD OF THE INVENTION

This invention relates in general to a brush, and more specifically relates to a brush which includes a hook for attaching the brush to the side of a can, pan or pot and which can be formed in a two step process wherein a tuft is formed and the handle is molded around the tuft.

BACKGROUND OF THE INVENTION

Pastry brushes, paint brushes, and similarly designed brushes all follow one general construction. This construction consists of an elongate handle extending to a widened portion of the handle where a tuft, or short cluster of elongate bristles, is anchored to the handle by a ferrule or an adhesive.

There are several problems inherent in such a conventional construction. For example, there generally is no good way to set a brush down when there is fluid (such as paint on a paint brash or butter on a pastry brush) on the bristles. If the brush is laid flat upon a surface, the bristles will also contact the surface and the fluid on the bristles will flow onto the surface.

Other problems may occur when one tries to set the brush in the container (such as a can, pan or pot) containing the fluid. If the brush is left in the container, the fluid level may be so high as to extend over the ferrule thereby creating a mess for the user. In response to this, prior brush designers have added hooks onto the side of the brushes so that the brush may hang on the edge of the container. Such hooks are disclosed in U.S. Pat. Nos. 1,763,696 and 4,887,327. The problem with the hooks disclosed in these patents is that the hooks serve only as a hanger, and no provision is made for positioning the bristles with respect to the container and the fluid level within the container when the brush is hanging from the hook. Generally, the hangers force the brush to extend against the side of the container, which may be dirty or oily, or may have paint extending along its side. This oil, dirt, or other fluid may get on the handle or higher on the bristles than the user prefers. When the brush is used again, the user may get fluid on his hands, or the fluid on the brush may drip on the surroundings.

U.S. Pat. No. 3,338,731 to McBride discloses a paint brush holder having a helix which can be secured at an angle to the longitudinal axis of the brush so that it may clip over the edge of a pail or paint can. By securing the brush at a position away from the longitudinal axis of the brush, the brush may be held at an optimal angle with respect to the edge of the container. Thus, the bristles may extend into the container to drain excess paint. While this positioning is more desirable than that provided by the hooks in U.S. Pat. Nos. 1,763,696 and 4,887,327, the addition of the hook may be an impediment to use of the brush and could possibly be dangerous to a user. There is a need for a more desirable way of positioning a brush with respect to a container and the fluid level therein when the brush is not in use.

The construction of paint brushes and pastry brushes is basically the same, with minor variations due to the nature of use. Generally, in a paint brush, the bristles are held together at one end and are crimped to the handle by a metal ferrule. More modern designs of paint brushes use glue or epoxy at one end of the bristles, the glue or epoxy forming a "knot", and the knot and the bristles forming a "tuft". The handles which are used with the tufts are usually plastic and include a pocket for receiving the tuft. The tuft may be glued in place with an appropriate epoxy or glue. Pastry brushes, on the other hand, because they are used in food applications, must be made of specific materials which are available for use in the food industry. Instead of typical bristles, filaments of nylon or boar hair are used for the pastry brushes. In addition, the handles and ferrules are made of polypropylene, because of its available use in food applications. Only a selected number of glues or epoxies are available for use in food applications because of the toxicity of many adhesives.

The limited materials available for use in the food industry can make the construction of a pastry brush significantly more difficult than the construction of a paint brush. Using plastic or polypropylene ferrules does not allow the advantage of crimping that metal ferrules provide. Instead, glue must be used to hold the tufts within the plastic ferrules. It has been found that the glues available for use in food preparation products will not stick to polypropylene or other materials available for food preparation products to a degree which is satisfactory to create a bond between the handle and the tuft. In response to this, manufacturers have formed the polypropylene handles with irregular shapes formed within the pockets in the handles. By providing these irregular shapes, the glue or epoxy may fill the voids around the irregular shapes and bond to itself around the shape, forming an anchor for the tuft. For example, in U.S. Pat. No. 3,323,162, internal lugs are used to hold the tufts within the brush. The problem with these types of construction is that the internal lugs may be hard to form, or gluing within a pocket on the handle may be difficult or labor intensive.

To facilitate construction of the pastry brushes, the bristles or filaments are often formed together and glued at one end to form a knot. An internal ferrule then may be used which extends around the knot and includes ridges or protrusions for holding the knot in place. This internal ferrule is then glued inside a pocket of the handle or snapped into place.

As can be understood from the above description, the inability to glue a tuft directly to a polypropylene handle has led manufacturers to many different ways to overcome the problem of attaching the bristles to the handle of a brush. However, each of these prior methods of construction are labor intensive. There is a need for a more simple method of attaching the tufts to the handles.

SUMMARY OF THE INVENTION

The brush and method of constructing a brush of this invention successfully overcome the above problems by providing an improved brush construction including a hook on the side of the brush handle for hanging the brush on a container such as a can, pan or pot. The hook is arranged such that the handle extends outward for easy grasping, and the bristles extend toward the center of the pot, instead of along the side of the container, so that the bristles drip into the container, and the brush will not stick to the side. The hook has an end which converges to a point so that the end of the hook may fit squarely against the top of the container.

The present invention also provides a tuft with a tapered knot, the taper extending outward so as to form a flange. The flanged knot is used in a method of forming a brush by directly injection molding the handle around the tapered knot of the tuft. Alternatively, the handle may be injection molded with a tapered pocket, and the tuft may be inserted in the pocket while the handle is still warm. The taper along the side of the knot works as a flange and prevents the tuft from being pulled out of the handle. The brush does not need additional gluing and is ready for use once the handle hardens.

More particularly described, the present invention is a brush having a front side, a back side, and two side edges thereon. The brush includes a handle having a grip portion and an anchor portion. The brush further includes a tuft having bristles and attached to the handle at the anchor portion and extending from the handle such that a grip end and a bristle end are defined. A hook is included in the anchor portion of the handle. The hook constitutes a protrusion formed by an inset in the handle of the brush. Preferably, the inset is in the anchor portion of the handle and along one of the side edges of the handle.

The present invention further provides a tuft, having a bristle end and a grip end, for use in forming a brush. The tuft includes bristles and a knot formed at one end of the bristles. The knot includes a tapered section which increases in width from the point closest to the bristle end of the tuft to the point which is towards the grip end of the tuft.

The present invention further provides a method of forming a brush. In the method, a tuft, having a bristle end and a grip end, is formed with a knot at the grip end of the bristles. The knot includes a tapered section which increases in width from the point closest to the bristle end of the tuft to the point which is towards the grip end of the tuft. After the tuft is formed, a handle is molded around the knot of the brush such that once the molded handle is set, the tapered knot serves as an anchor in the handle to hold the tuft in place in the handle.

Therefore, it is an object of the present invention to provide an improved brush and method of construction for a brush.

It is a further object of the present invention to provide a brush which can hang at a preferred orientation from the side of a container.

Another object of the present invention is to provide a drip guard for preventing paint from getting on the hands of a user.

Yet another object of the present invention is to provide a stand for holding the bristles away from a surface when the brush is laid upon the surface.

It is still another object of the present invention to provide a method of forming tufts into a handle without gluing the tufts to the handle.

Still another object of the present invention is to provide a one-step molding process for attaching tufts of a brush to the handle of the brush and forming the handle of the brush.

Other objects, features, and advantages of the present invention will become apparent upon reading the following detailed description of a preferred embodiment of the invention, when taken in conjunction with the drawings and appended claims.

BRIEF DESCRIPTION OF THE DRAWINGS

FIG. 1 is a perspective view of a brush embodying the present invention.

FIG. 2 is a front view of the brush of FIG. 1 shown as hanging on the side of a container, with part of the container cut away so that the engagement of the hook and the can may be shown.

FIG. 3 is a side view of the brush of FIG. 1, shown laying on a surface.

FIG. 4 is a front view of a tuft for use in the brush of FIG. 1.

FIG. 5 is a side view of the tuft of FIG. 4.

FIG. 6 is a schematic of a prior art tuft mold.

FIG. 7 is a schematic of a tuft mold for use in developing the tuft of FIG. 4.

FIG. 9 is a cutaway view of the brush of FIG. 2, taken along the perspective lines 9—9.

DETAILED DESCRIPTION OF THE PREFERRED EMBODIMENT

Figure 8:
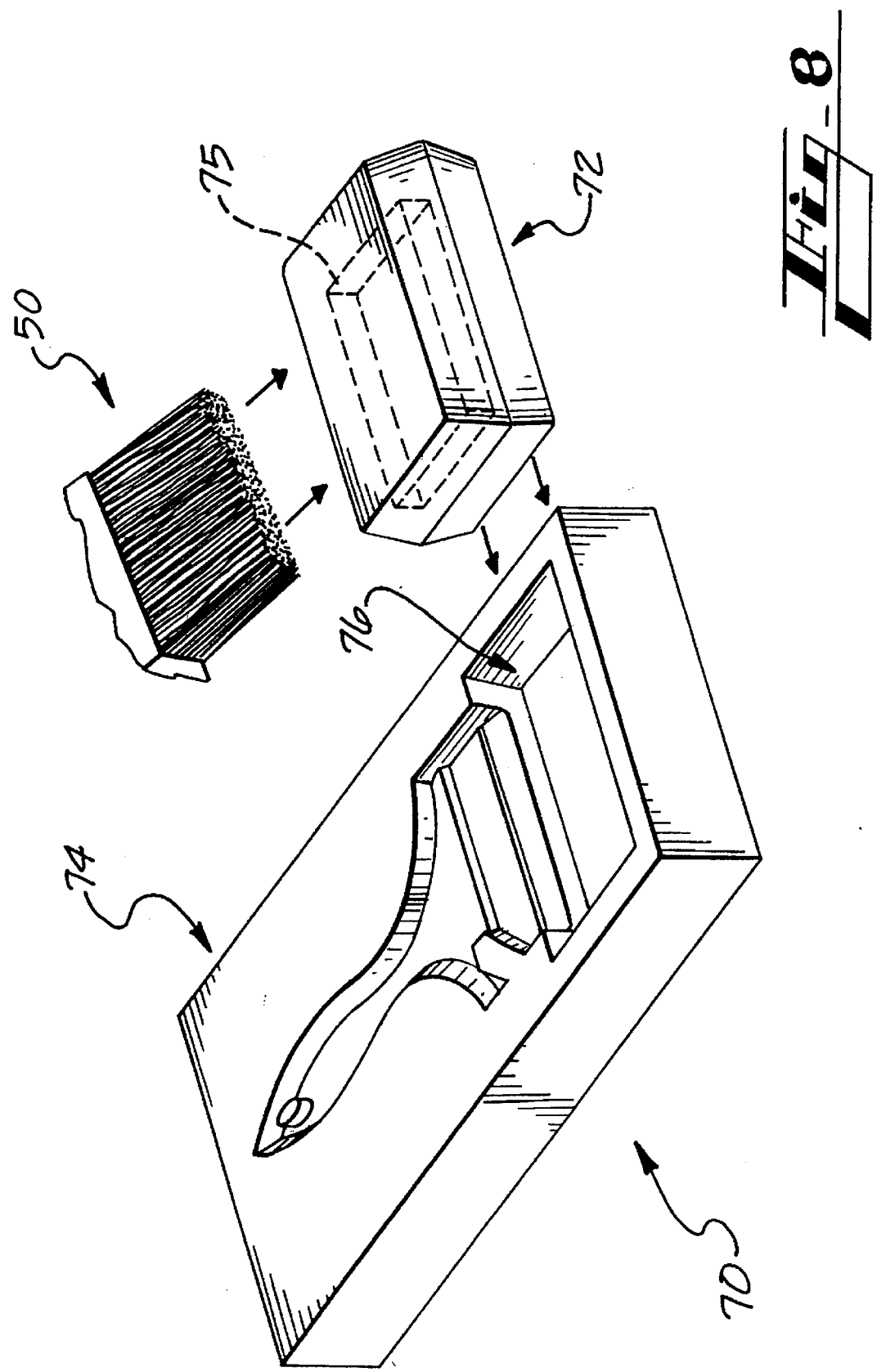
FIG. 8 is a perspective view of two pieces of the three-piece mold for use in making the brush of FIG. 1.

Turning now to the drawings, in which like reference numerals represent like elements throughout the several views, FIG. 1 displays a brush 10 embodying the present invention. The brush 10 described is a pastry brush. However, it is to be understood that the construction and method of forming the brush described herein could be applied to paint brushes or any other similarly formed brush. The brush 10 includes a handle 12 and a tuft 14 extending out of the handle. The handle 12 may be made of plastic, or any other suitable material, but in the preferred embodiment of a pastry brush is polypropylene. The tuft 14 is a short cluster of elongate bristles 15. The bristles 15 may be boar hair, filaments of nylon, or any other suitable material, as is known in the brush industry.

The handle 12 includes a grip portion 16 flaring outwardly at one end into a curved base wall 18. Extending outwardly from the base wall 18 is a rectangular sleeve corresponding to the usual position of a ferrule on a brush, hereinafter referred to as the anchor portion 20. For ease of reference, the brush 10 defines a longitudinal axis 21, a front side 22, a back side 24, first and second edges 26, 27 extending the length of the brush, a grip end 28, and a bristle end 29.

As can best be seen in FIG. 2, the brush 10 of the present invention includes a novel hook 30 for hanging the brush on the side of a container 32. The hook 30 is a protrusion which is formed by a removed part of the anchor portion 20 of the brush 10 such that an inset 34 is foraged in one side edge 26 of the anchor portion. The hook 30 preferably extends downward from closer to the grip end 28 of the brush toward the bristle end 29 of the brush. The inner surface of the inset 34 includes two flat spots 36 and 38 at the end such that a triangular shape is formed at the end of the inset 34.

As can be seen in FIG. 2, the hook 30 is advantageous in that it may support the brush in an upright position from one side edge 26 of the brush while allowing the tuft 14 to hang towards the center of the container 32 such that the bristles 15 on the tuft are free to drip into the center of the container. Although the end of the inset 34 could be rounded or any other suitable shape, the flat spots 36, 38 in the inset 34 converge to a point 37 at the end of the inset 34 that allows the top of the container to contact at least two locations at the top point 37 of the inset 34, giving a more stable positioning of the brush 10 on the container edge and preventing rocking.

It can also be appreciated that the advantageous configuration of the hook 30 allows the user to use the brush 10 without impedance or hindrance of a protruding hook. Unlike prior art hooks which are placed on the outer portion of brushes and protrude therefrom, the hook 30 of the present invention is formed by removing part of the brush handle 12 so that it does not protrude where it can snag or otherwise hinder the normal use of the brush.

As can best be seen in FIG. 3, the brush 10 of the present invention also provides drip guards and stands consisting of two flanges 42, 44. The flanges 42, 44 extend from the front side 22 and back side 24 of the brush 10, respectively. The positioning of the flanges 42, 44 blocks fluid running down or dripping off the front and back sides 22, 24 of the brush 10 and prevents the fluid from reaching the grip portion 16 of the brush. The flanges 42, 44 also serve the purpose of a stand when the brush 10 is set upon a surface S. As can be seen in FIG. 3, the flange 44 contacts the surface S and spaces the bristles 15 away from the surface. In this manner, the fluid on the bristles 15 is distanced from the surface S when the brush is set upon the front or back sides 22, 24.

As can be seen in the drawing, the flanges 42, 44 do not extend around the side edges 26, 27 of the brush 10. This design of the brush 10 is advantageous over prior art designs in that the brush may be easily maneuvered in tight spots without extensions on the sides getting in the way.

The present invention also provides a novel method of construction for a brush. As best can be seen in FIGS. 4 and 5, the tuft 14 of the present invention includes a knot 50 at one end which consists of glue, resin, or some other type of material which can hold the individual bristles 15 in place. The knot 50 is tapered outward from a point closest to a bristle end 52 of the tuft 14 toward a grip end 54 of the tuft such that the grip end of the knot is larger in cross-sectional area than the bristle end.

The formation of the tapered knot 50 requires a new method of construction. With reference to FIG. 6, a prior art method of forming tufts is shown. Generally, tufts 114 are formed by pressing a number of bristles 115 partially through a die 160 in the direction of the arrow A between two side walls 162 and applying glue or resin at the bottom of the bristles forming a knot 150, and then pulling the bristles the rest of the way through the die. This method of forming the tufts 114 forms a straight tuft having substantially uniform thickness and width, including the thickness and width of the knot 150, along its entire length.

In contrast, the present invention provides a tuft 14 that includes a knot 50 which is formed with a taper, the taper extending outward so as to form a flange. The formation of this tapered knot 50 requires a different method of forming the tuft 14. As with the prior art method, the bristles 15 are pulled partially through a die 60 between side walls 62. However, epoxy or glue is applied to the grip end 54 of the bristles 15 in excess and the tuft 14 is not pulled through the die 60 in the direction A, but instead is pulled back out in the reverse direction, or the direction B. By adding the excess glue and not pulling the tuft between the side walls 62 in the direction A, the tapered portion of the knot 50 ends up having a thickness and width greater than the distance between the two side walls 62, leaving the tapered knot configuration.

The brush 10 may then be formed by using the tuft 14 with the tapered knot 50. A mold 70 for use in forming the handle 12 of the present invention is set forth in FIG. 8. The mold 70 includes a bristle holder 72, a core side 74 of the mold, and cavity side (not shown, but a mirror image of the core side). The bristle holder 72 includes an opening 75 along one side for receiving the bristles 15 on the tuft 14. The core side 74 and cavity side include insets 76 for receiving the bristle holder 72. The insets 76 include magnets (not shown) for holding the bristle holder 72 in place.

To mold the handle 12, the bristles 15 are first placed in the opening 75 in the bristle holder 72 such that the knot 50 abuts the top edge of the bristle holder and forms a seal for the outer portion of the opening. The bristle holder 72 is then placed on one of the insets 76 such that the knot 50 faces the mold portion for the handle 12, and the core side 74 is closed against the cavity side (not shown). The handle 12 is then molded in the mold 70 around the knot 50. The high pressure of the injection molding machine allows the handle material to run completely around the knot 50 and into the portion of the mold corresponding to the extension 32. The injected handle 12 is then popped out of the mold 70 and the brush 10 cools.

As can be seen in FIG. 9, the addition of the flange to the knot 50 creates an anchor for the tuft and allows the tuft 14 to remain in position in the handle 12. Thus, in a brush where the handle 12 is made of a material such as polypropylene which will not properly adhere to glue or resin, the tuft is held in place by the anchor formed from the back end of the knot 50. Alternatively, the handle 12 may be injected separately such that a pocket (not shown) is formed in the handle, and the tuft 14 may be inserted in the pocket while the handle is still warm and the sides of the pocket are still pliable. However, this method requires assembly and an additional step which is not required in the above-described assembly.

While this invention has been described in detail with reference to preferred embodiments thereof, it is to be understood that variations and modifications can be affected within the spirit and scope of the invention as described herein before and as defined in the appended claims. For example, the tuft 14 featuring the tapered knot 15 could be formed in a variety of different methods, such as by hand carving the taper in the knot, other than that disclosed. In addition, the brush 10 could be formed without the flanges 42, 44 or with flanges extending all the way around the brush 10.

What is claimed is:

1. A method of forming a tuft for a brush comprising the steps of:

providing a plurality of bristles, defining first and second ends thereon, and a mold defining a first side and second side and having an opening extending from the first side to the second side, the opening defining (1) a first region adjacent to the second side and having a first cross-section corresponding to the final cross-section of the bristles for the tuft, and (2) a second region extending between the first region and the first side and having an inside contour that increases in cross-sectional area from the first region to the first side;

extending the plurality of bristles into the opening of the mold such that the first end of the bristles extends into the second region of the opening;

forming a knot on the bristles at the second region by pouring a hardenable substance into the second region of the opening and allowing the hardenable substance to harden, the knot having a resulting cross-sectional area which matches the inside contour of the second region; and removing the knot and bristles from the mold such that the cross-sectional area of the knot matches the inside contour of the second region.

2. The method of claim 1, wherein the knot decreases substantially linearly in cross-sectional area from the first end of the bristles to the end of the knot nearest the second end of the bristles.

3. The method of claim 1, wherein the bristles are initially pulled into the mold from the first side of the mold.

4. The method of claim 3, wherein the plurality of bristles are removed from the opening of the mold in a direction which extends from the second end of the bristles to the first end of the bristles.

5. The method of claim 1, wherein the cross-section of the knot closest to the second end of the bristles is substantially the same as the first cross-section.

6. A method of forming a brush comprising the steps of:
   forming a tuft for a brush comprising the steps of:
      providing a plurality of bristles, defining first and second ends thereon, and a mold defining a first side and second side and having an opening extending from the first side to the second side, the opening defining (1) a first region adjacent to the second side and having a first cross-section corresponding to the final cross-section of the bristles for the tuft, and (2) a second region extending between the first region and the first side;
      extending the plurality of bristles into the opening of the mold such that the first end of the bristles extends into the second region of the opening;
      forming a knot on the bristles at the second region by pouring a hardenable substance into the second region of the opening and allowing the hardenable substance to harden, the knot having a resulting cross-sectional area which matches the inside contour of the second region; and
      removing the knot and bristles from the mold such that the cross-sectional area of the knot matches the inside contour of the second region; and
      molding a handle around the knot such that once the molded handle is set, the tapered knot serves as an anchor in the handle to hold the tuft in place in the handle.

7. The method of claim 6, wherein the plurality of bristles are removed from the opening of the mold in a direction which extends from the second end of the bristles to the first end of the bristles.

8. The method of claim 6, wherein the handle comprises polypropylene.

9. The method of claim 8, wherein the tuft comprises boar hair.

10. The method of claim 6, wherein the cross-section of the knot closest to the second end of the bristles is substantially the same as the first cross-section.

11. A method of forming a brush comprising the steps of:
    providing a tuft having a bristle end and a grip end, the tuft comprising:
       a plurality of bristles compacted together to form a first cross-section;
       a knot formed at the end of the bristles, the knot comprising a tapered section which increases in cross-section from the point closest to the bristle end of the tuft to the point which is towards the grip end of the tuft;
    placing the bristles of the tuft into a receptacle in an insert such that the knot abuts the opening of the receptacle, the cross-section of the knot at the point closest to the bristle end of the tuft comprising a cross-sectional area which is substantially the same as the cross-sectional area of the opening of the receptacle such that the knot forms a seal for the receptacle;
    placing the tuft and insert into a mold;
    molding a handle in the mold around the knot of the brush such that once the molded handle is set, the tapered knot serves as an anchor in the handle to hold the tuft in place in the handle; and
    removing the brush handle from the mold and removing the insert from the tuft.

12. The method of claim 11, wherein the handle comprises polypropylene.

13. The method of claim 12, wherein the tuft comprises boar hair.

14. The method of claim 11, wherein the cross-section of the knot closest to the bristle end of the tuft is substantially the same as the first cross-section.

* * * * *